US007886540B2

(12) United States Patent
Webb

(10) Patent No.: US 7,886,540 B2
(45) Date of Patent: Feb. 15, 2011

(54) COMBUSTOR LINERS

(75) Inventor: RenéJames Webb, West Knighton (GB)

(73) Assignee: Alstom Technology Ltd., Baden (CH)

( * ) Notice: Subject to any disclaimer, the term of this patent is extended or adjusted under 35 U.S.C. 154(b) by 1061 days.

(21) Appl. No.: 11/652,222

(22) Filed: Jan. 11, 2007

(65) Prior Publication Data

US 2007/0180828 A1 Aug. 9, 2007

(30) Foreign Application Priority Data

Jan. 14, 2006 (GB) .................................... 0600761

(51) Int. Cl.
F02C 1/00 (2006.01)
F02G 3/00 (2006.01)
(52) U.S. Cl. .......................................... 60/752; 60/753
(58) Field of Classification Search ............ 60/752–760
See application file for complete search history.

(56) References Cited

U.S. PATENT DOCUMENTS

| 1,539,461 A | | 5/1925 | Breitling | |
|---|---|---|---|---|
| 3,978,662 A | * | 9/1976 | DuBell et al. .................. | 60/757 |
| 4,259,842 A | | 4/1981 | Koshoffer et al. | |
| 4,380,906 A | | 4/1983 | Dierberger | |
| 4,567,730 A | | 2/1986 | Scott | |
| 4,655,044 A | * | 4/1987 | Dierberger et al. ............ | 60/753 |
| 5,333,443 A | * | 8/1994 | Halila ........................... | 60/796 |
| 5,363,643 A | * | 11/1994 | Halila ........................... | 60/796 |
| 5,894,732 A | * | 4/1999 | Kwan ........................... | 60/756 |
| 6,675,582 B2 | * | 1/2004 | Monty et al. ................... | 60/752 |
| 6,931,855 B2 | * | 8/2005 | Glessner et al. ................ | 60/772 |
| 7,007,481 B2 | * | 3/2006 | McMasters .................... | 60/752 |
| 7,093,439 B2 | * | 8/2006 | Pacheco-Tougas et al. .... | 60/752 |
| 7,093,440 B2 | | 8/2006 | Howell et al. | |
| 7,608,122 B2 | * | 10/2009 | Snyder ......................... | 55/306 |
| 2005/0247062 A1 | * | 11/2005 | Jeppel et al. ................... | 60/752 |

FOREIGN PATENT DOCUMENTS

| FR | 71.34809 | 6/1972 |
|---|---|---|
| GB | 843178 | 8/1960 |
| GB | 2 160 964 A | 1/1986 |

* cited by examiner

Primary Examiner—William H Rodríguez
(74) Attorney, Agent, or Firm—Kirschstein, et al.

(57) ABSTRACT

A combustor liner for use in a gas turbine engine includes a first liner section and a second liner section. They are joined together by welding or a mechanical fixing along a common join line or weld. A heat shield extends along the join line to protect it from the high temperatures and thermal stresses that are experienced by the combustor liner during the operation of the gas turbine engine. The heat shield is spaced apart from the joint line to define a passage between the heat shield and the first and second liner sections for the introduction of a cooling fluid such as air. The heat shield and the exposed surfaces of the liner sections are coated with a thermal barrier coating.

15 Claims, 5 Drawing Sheets

COMBUSTOR LINERS

FIELD OF THE INVENTION

The present invention relates to combustor liners for use in gas turbine engines, and in particular to combustor liners that are formed from two or more liner sections that are welded or mechanically joined together.

DESCRIPTION OF THE RELATED ART

In a gas turbine engine, a mixture of compressed air and fuel is supplied to a combustion chamber where it is ignited and the resulting gases are used drive a turbine. The combustion chamber is defined by radially inner and outer combustor liners. These are often formed in a number of separate sections and are welded or mechanically joined together during the assembly of the gas turbine engine. To protect the inner and outer combustor liners from the high temperatures that are generated within the combustion chamber, it is generally preferred that the exposed inner surfaces are coated with a thermal barrier coating (TBC) such as yttria partially stabilized zirconia (YSZ), which exhibits resistance to thermal shock and fatigue up to 1150° C. The YSZ coating can be deposited using a plasma spraying or electron beam physical vapor deposition process. However, those TBCs that are currently available cannot be applied over a weld and the operational lifetime of the welded joint between the combustor liner sections is therefore extremely limited.

SUMMARY OF THE INVENTION

The present invention provides a combustor liner comprising a first liner section and a second liner section joined together along a common join line, and a heat shield that together with the first and second liner sections forms a substantially continuous surface of the combustor, the heat shield extending along the join line but spaced apart therefrom to define a passage between the heat shield and the first and second liner sections for the introduction of a cooling fluid.

The combustor liner can be an inner combustor liner or an outer combustor liner.

The region of the join line (i.e. the weld line, the mechanical join line or the simple line of contact or abutment between the adjacent edges of the liner sections) is therefore protected by the heat shield from the high temperatures and the thermal stresses that are experienced by the combustor liner during the operation of the gas turbine engine. In other words, in the case of a conventional annular combustion chamber, the heat shield is radially located between the interior of the combustion chamber and the join line between the adjacent liner sections. Further protection is afforded by the introduction of a cooling fluid such as air, for example, through the passage to reduce the temperature of the liner sections in the region of the join line. The heat shield can be integrally formed with at least one of the first and second liner sections. Alternatively, the heat shield is formed as a separate component and then fitted to the liner sections by any suitable means. Some suitable means are described in more detail below but, in practice, it will depend on the particular application and the shape of the components.

The adjacent edges of the first and second liner sections preferably include a first part and a second part that together define a u-shaped channel between them. The first part may take the form of a connecting flange and the first and second liner sections can be joined by welding or mechanically fixing the adjacent connecting flanges together in a known manner.

The second parts of the first and second liner sections may take the form of a retention flange to retain the heat shield in position and prevent it from moving radially away from the join line towards the interior of the combustion chamber. The heat shield may be biased away from the join line and into contact with the retention flange.

The first parts of the first and second liner sections are preferably joined together along the common join line and the heat shield can extend from the second part of the first liner section to the second part of the second liner section across the join line.

The axially extending edges of the heat shield can include a u-shaped channel for receiving the retention flanges of the first and second liner sections. The heat shield can then be inserted into the space between the retention flanges of the first and second liner sections after the first parts have been joined together such that the retention flanges of the first and second liner sections are slidably received in the u-shaped channels defined by the axially extending edges of the heat shield. A sealing means can also be included to provide a seal between a surface of the heat shield and the retention flanges to prevent the hot ignition gases in the combustion chamber from entering the passage between the heat shield and the liner sections.

In the case where the axially extending edges of the heat shield define u-shaped channels, it will be appreciated that part of each edge lies above the retention flange (that is facing onto the interior of the combustion chamber) and another part of the edge lies below the retention flange in use. To avoid the need to slide the heat shield into position from an end of the combustion chamber, one of the retention flanges can be formed with a castellated construction. The part of the heat shield lying below the retention flanges in use can also be formed with a corresponding castellated construction. The heat shield can then be fitted to the first and second liner sections as follows. First of all, the axially extending edge of the heat shield that does not include a castellated part is fitted to the non-castellated retention flange by simply inserting the non-castellated retention flange into the u-shaped channel of the heat shield. At this point the heat shield will be positioned at an angle to the first and second liner sections and the non-castellated retention flange will only be partially received in the u-shaped channel. If necessary, the axial positioning of the heat shield can then be adjusted be sliding it backwards or forwards until the lands of the castellated part of the edge of the heat shield are properly aligned with the slots of the castellated retention flange, and the lands of the castellated retention flange are properly aligned with the slots of the castellated part of the edge of the heat shield. The heat shield can then be pivoted into position such that the lands of the castellated retention flange pass through the slots of the axially extending edge of the heat shield and vice versa until the castellated retention flange is received in the u-shaped channel of the heat shield. It will be readily appreciated that the slots and lands provided on the retention flange and the heat shield will be sized and shaped such that they will not interference with each other when the heat shield is moved into position.

Once the castellated retention flange is located in the unshaped channel, the heat shield is moved in the axial direction relative to the liner sections until the lands of the castellated part of the edge of the heat shield are axially aligned with the lands of the castellated retention flange. This prevents the heat shield from being able to move in the radial direction. However, it is generally preferred that the lands are welded or pinned together to firmly secure the heat shield in position. The part of the axially extending edge of the heat shield that lies above the castellated retention flange will completely cover the aligned slots so that the space between the heat shield and the first parts of the liner sections is not open to the interior of the combustion chamber.

In an alternative arrangement, both of the retention flanges and the parts of both of the axially extending edges of the heat shield that lie below the retention flanges in use can be castellated.

The heat shield can be joined to the first parts of the first and second liner sections by fixed connectors, spring connectors, plunger springs, or by any other suitable mechanical fixing.

The second part of one or both of the first and second liner sections may also be adapted to form all or part of the heat shield. The first parts of the first and second liner sections are preferably joined together along the common join line and the second parts of the first and second liner sections can extend along the join line to form the heat shield.

A surface of the heat shield and the first and second liner sections are preferably coated with a thermal barrier coating such as yttria partially stabilized zirconia (YSZ), for example.

The first and second liner sections and the heat shield may be formed from a suitable commercially available alloy such as Inconel 617 or Hastalloy X, for example.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
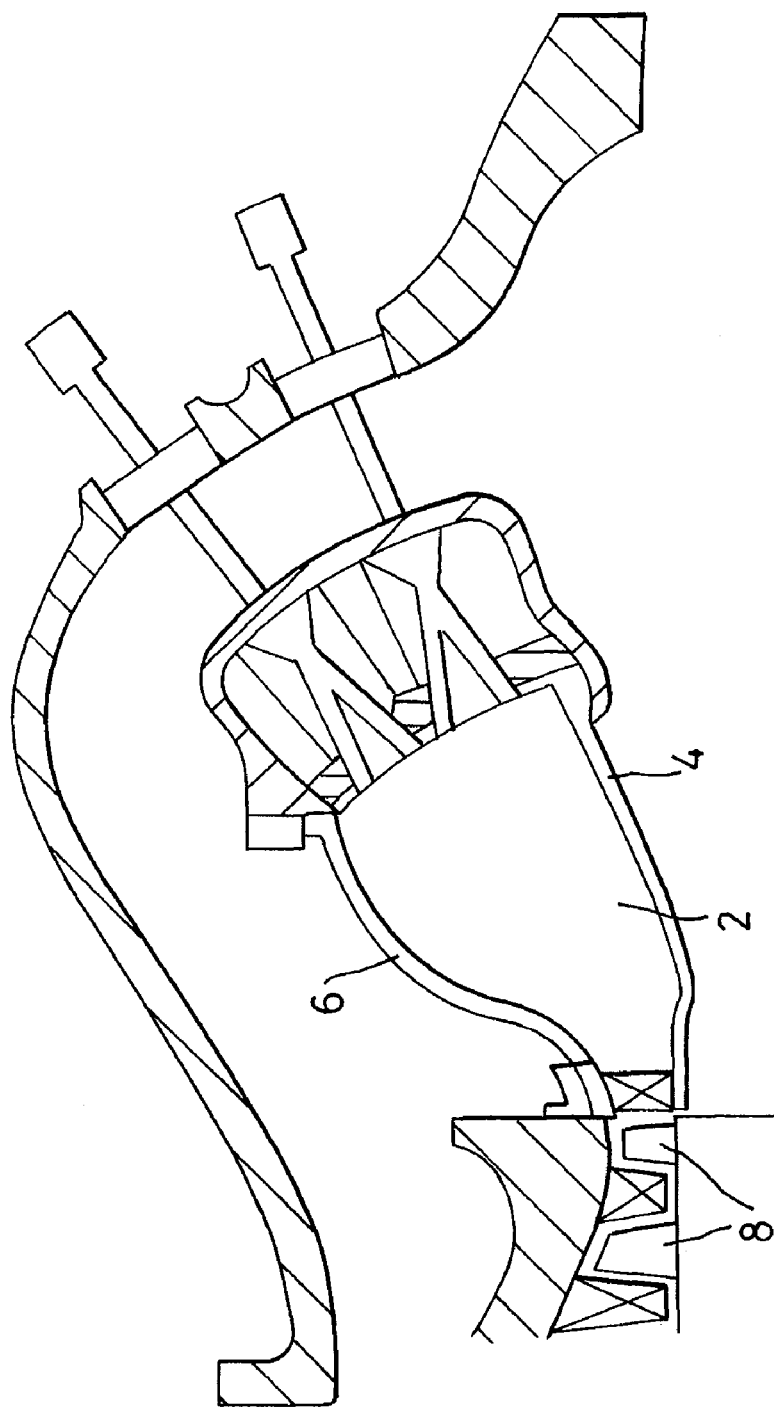
FIG. 1 is a cross-section view of part of a gas turbine engine showing the inner and outer combustor liners.

FIG. 1 shows part of a gas turbine engine in which an annular combustion chamber 2 is formed by a radially inner combustor liner 4 and a radially outer combustor liner 6. A mixture of compressed air and fuel is supplied to the combustion chamber 2 where it is ignited and the resulting gases are used drive a series of moving blades 8. Although the invention is described below with reference to the inner combustor liner 4, it will be readily appreciated that the outer combustor liner 6 can be formed in the same way.

Figure 2:
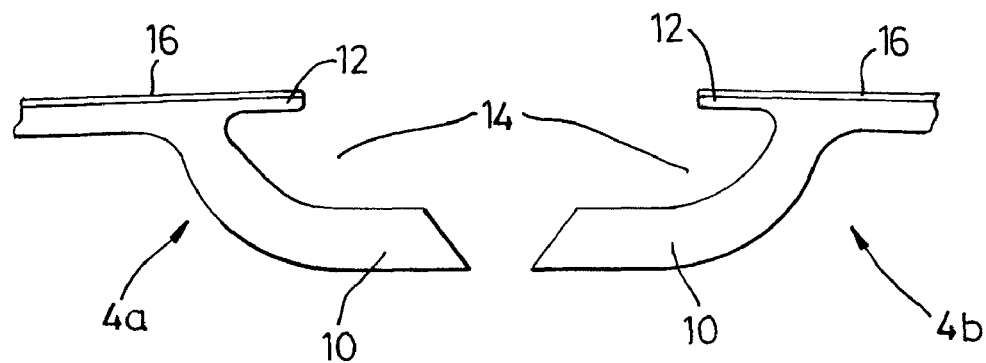
FIG. 2 is an end view of an inner combustor liner according to a first embodiment of the present invention before the first and second liner sections are welded together.
Figure 3:
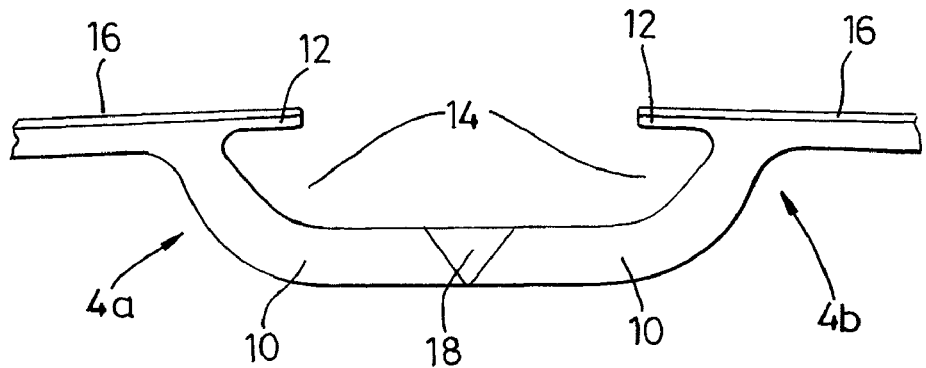
FIG. 3 is an end view of the inner combustor liner of FIG. 2 after the first and second liner sections have been welded together.

The inner combustor liner 4 is formed from two or more individual liner sections made of the commercially available alloy Inconel 617. To construct the inner combustor liner 4, the liner sections are joined together along their axially extending edges. The way in which two adjacent liner sections 4a and 4b are joined together will now be explained with reference to FIGS. 2 to 4. Each liner section 4a and 4b has a pair of axially extending edges (only one of which is shown) that include an arcuate connecting flange 10 and a retaining flange 12. A unshaped channel 14 is formed between the connecting flange 10 and the retaining flange 12 of each liner section. A thermal barrier coating (TBC) 16 of yttria partially stabilized zirconia (YSZ) is applied to the exposed inner surface of the liner sections 4a and 4b (i.e. the surface that forms the inner surface of the combustion chamber), including the retaining flange 12. As shown in FIG. 3, the facing connecting flanges 10 of the liner sections 4a and 4b are welded together using a tungsten inert gas welding process with an Inconel electrode. The weld 18 forms a join line that runs the full length of the liner sections 4a and 4b in the axial direction.

Figure 4:
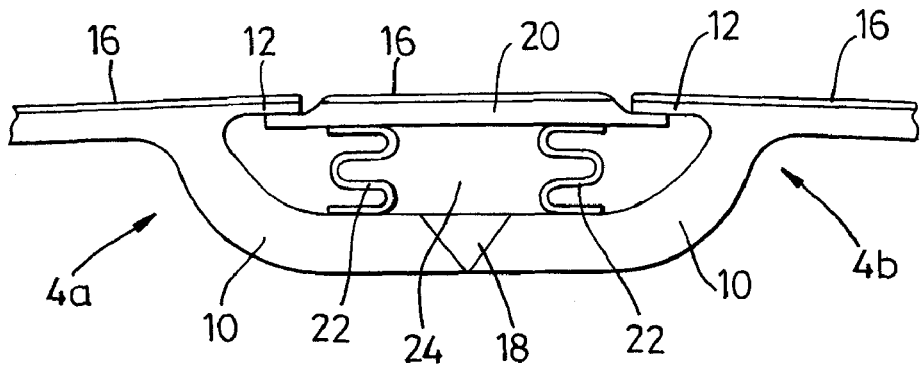
FIG. 4 is an end view of the inner combustor liner of FIG. 2 after the heat shield has been inserted.

A heat shield 20 made of Inconel 617 is then fitted behind the facing retention flanges 12 of the liner sections 4a and 4b as shown in FIG. 4. The exposed inner surface of the heat shield 20 is also coated with a TBC 16 of YSZ and is secured to the connecting flanges 10 by a pair of spring connectors 22. The heat shield 20 extends along the weld join line 18 but is spaced apart from it. Because the connecting flanges 10 are arcuate and extend away from the remainder of the liner sections 4a and 4b, a gap or passage 24 is defined between the heat shield and the liner sections. The heat shield 20 protects the structurally weak weld 18 and the adjacent heat affected zone (HAZ) from the high temperatures and thermal stresses inside the combustion chamber. In addition, cooling air is passed through the passage 24 to reduce the temperature of the connecting flanges 10 in the region of the weld 18. The gas turbine engine can therefore operate at a higher temperature while at the same time maintaining the structural integrity of the inner combustor liner 4.

Figure 5:
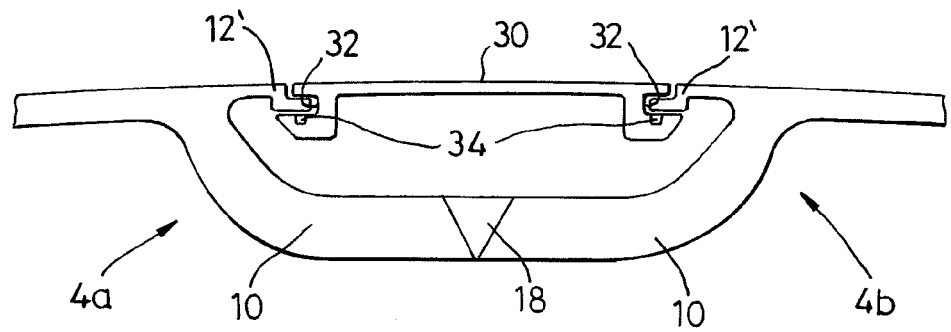
FIG. 5 is an end view of an inner combustor liner according to a second embodiment of the present invention.

It will be noted that together with the first and second liner sections 4a and 4b, the heat shield 20 forms a substantially continuous surface of the combustor, With reference to FIG. 5, an alternative heat shield 30 can also be formed with u-shaped channels 32 along its axially extending edges for receiving the facing retaining flanges 12' of the liner sections 4a and 4b. A seal 34 is provided between the heat shield 30 and each of the retaining flanges 12' to prevent the hot ignition gases in the combustion chamber flowing past the retention flange 12' and entering the passage 24. The connecting flanges 10 of the liner sections 4a and 4b are welded together as described above and the heat shield 30 is then slid into position using the retaining flanges 12' as runners from one end of the inner combustor liner 4. The heat shield 30 can be formed in more than one axial section if this is necessary for ease of installation. In this case, a seal or overlap will be provided between the axially adjacent sections.

Figure 6:
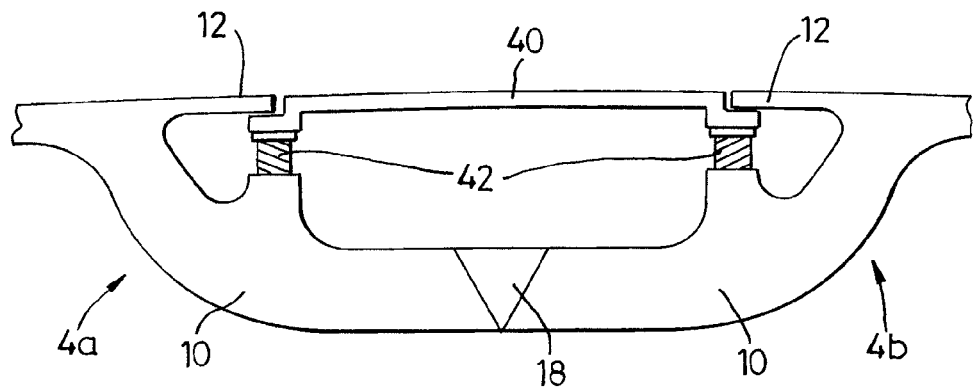
FIG. 6 is an end view of an inner combustor liner according to a third embodiment of the present invention.

With reference to FIG. 6, an alternative heat shield 40 can also be joined to the connecting flanges 10 of the liner sections 4a and 4b using plunger springs 42. The springs 42 are captive inside hollow pins (not shown) that sit in a hole in the connecting flanges 10. The springs 42 are depressed with the heat shield 40 is inserted in place to effectively lock the heat shield in position. A similar method of fixing is used in gear boxes and shaft couplings.

Figure 7:
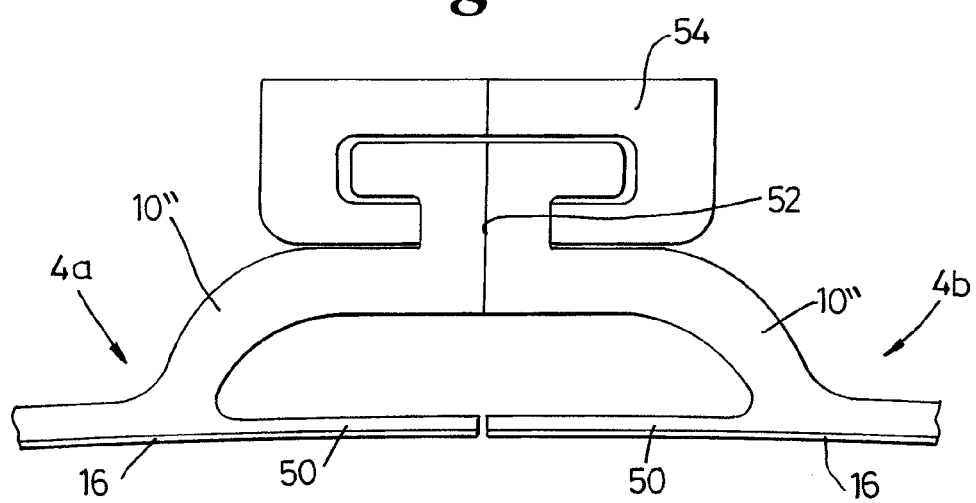
FIG. 7 is an end view of an inner combustor liner according to a fourth embodiment of the present invention.

A further alternative heat shield can be integrally formed as part of the liner sections 4a and 4b themselves. As shown in FIG. 7, the axially extending edges of the liner sections 4a and 4b are provided with an extended flange 50 that are separated by a very small gap or are actually in contact with each other when the connecting flanges 10" are joined together. The extended flanges 50 therefore together form a heat shield that extends axially along the join line 52. In this case, the connecting flanges 10" of the liner sections 4a and 4b are joined together using a mechanical fixing 54 that clamps around a rear part of the connecting flanges. However, the connecting flanges 10" could also be welded together as described above. A TBC 16 of YSZ is applied to the exposed inner surfaces of both of the extended flanges 50.

Figure 8:
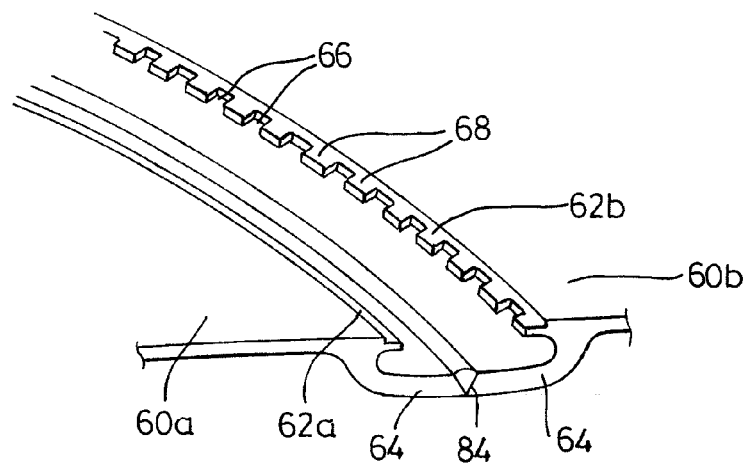
FIG. 8 is a perspective view of liner sections according to a fifth embodiment of the present invention having a castellated edge.
Figure 9:
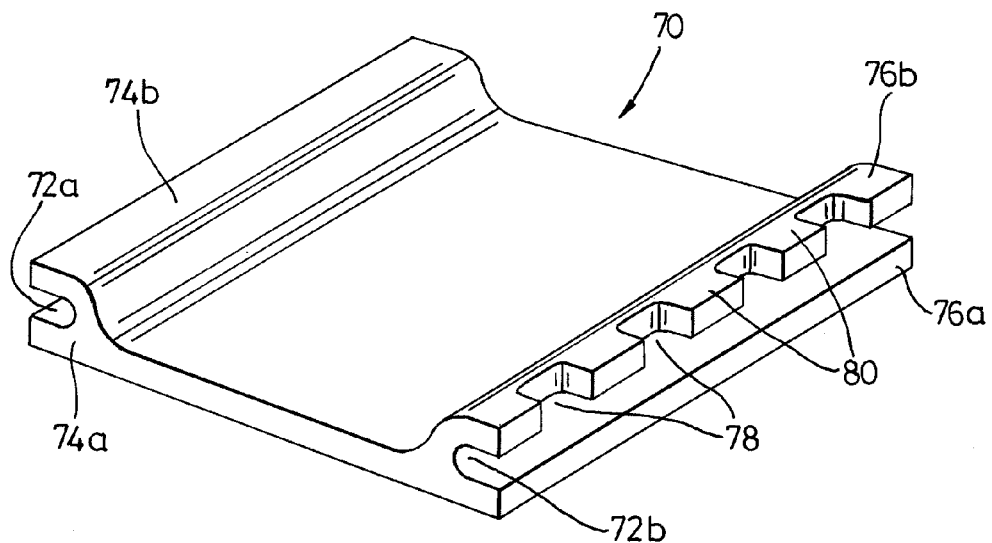
FIG. 9 is a perspective view of a heat shield having a castellated edge.

With reference to FIGS. 8 and 9 an alternative heat shield 70 has a u-shaped channel 72a along one of its axially extending edges for receiving the retaining flange 62a of a liner section 60a. The heat shield 70 also has a similar u-shaped channel 72b along the other of its axially extending edges for receiving the retaining flange 62b of an adjacent liner section 60b. The liner sections 60a and 60b have connecting flanges 64 that are welded together as described above. The channel 72a is defined by a pair of flanges 74a and 74b. Similarly, the channel 72b is defined by a pair of flanges 76a and 76b.

The flange 76b of the heat shield 70 is castellated. In other words, it is formed from a series of alternating slots 78 and lands 80. The retaining flange 62b is also castellated having a series of alternating slots 66 and lands 68.

Figure 10A:
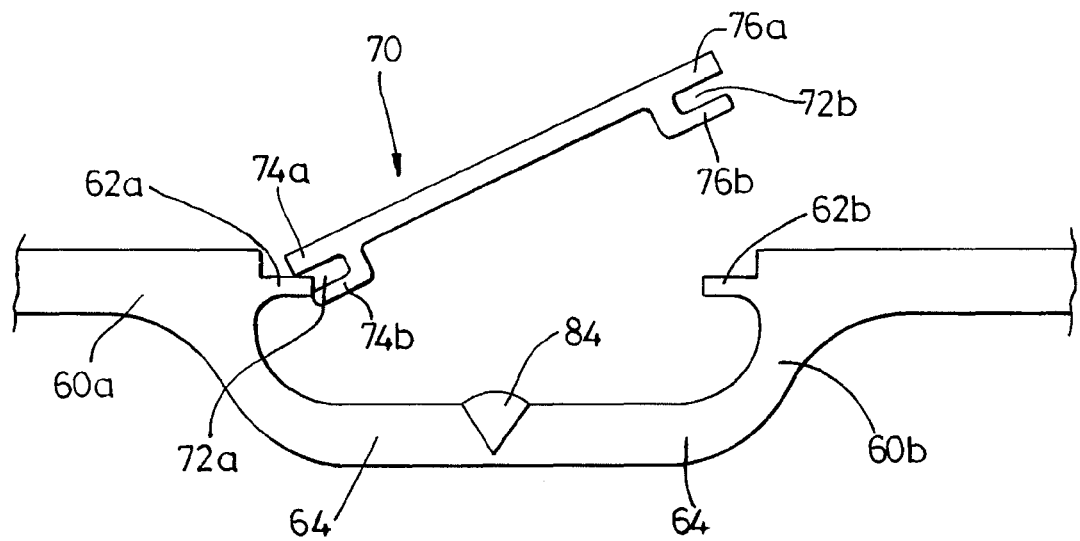
FIGS. 10A and 10B are end views showing how the heat shield of FIG. 9 is fitted to the liner sections of FIG. 8.
Figure 10B:
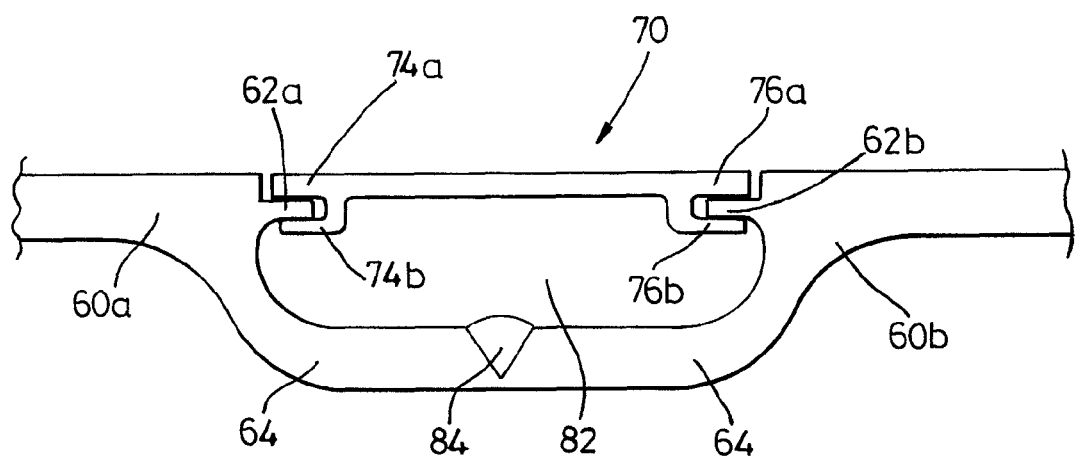

The way in which the heat shield 70 is fitted to the liner sections 60a and 60b will now be described with reference to FIGS. 10A and 10B. First of all, the heat shield 70 is positioned at an angle such that the retaining flange 62a is partially received in the channel 72a as shown in FIG. 10A. The other edge of the heat shield is then moved towards the liner section 60b such that the lands 80 of the castellated edge of the heat shield 70 pass through the slots 66 in the retaining flange 62b and the lands 68 of the retaining flange 62b pass through the slots 78 in the heat shield 70. The retaining flange 62b is therefore slidably received in the channel 72b and the retaining flange 62a is also slidably received in the channel 72a as shown in FIG. 10B.

Finally, the heat shield 70 is moved in the axial direction relative to the liner sections 60a and 60b until the lands 68 of the retention flange 62b are aligned with the lands 80 of the heat shield. The slots 66 of the retention flange 62b are also aligned with the slots 78 of the heat shield but they are completely closed by the non-castellated flange 76a. This prevents the hot ignition gases in the combustion chamber from entering the passage 82 between the heat shield and the liner sections through the aligned slots 66 and 78. The lands 68 and 80 can then be welded together to secure the heat shield 70 in position. As described above, cooling air can be introduced into the passage 82 to cool the connecting flanges of the liner sections 60a and 60b in the regions of the weld line 84.

I claim:

1. A combustor liner comprising a first liner section and a second liner section joined together along a common join line, and a heat shield that together with the first and second liner sections forms a substantially continuous inner surface of the combustor, the heat shield extending along the join line but spaced apart therefrom to define a passage between the heat shield and the first and second liner sections for the introduction of a cooling fluid, the passage being closed to a combustion chamber by the substantially continuous inner surface, thereby to restrain the cooling fluid from entering the combustion chamber.

2. The combustor liner according to claim 1, wherein the heat shield is integrally formed with at least one of the first and second liner sections.

3. The combustor liner according to claim 1, wherein the adjacent edges of the first and second liner sections include a first part and a second part defining a u-shaped channel.

4. The combustor liner according to claim 1, wherein a surface of the heat shield is coated with a thermal barrier coating.

5. The combustor liner according to claim 1, wherein a surface of the first and second liner sections is coated with a thermal barrier coating.

6. The combustor liner according to claim 1, wherein the first and second liner sections are welded together.

7. The combustor liner according to claim 1, wherein the first and second liner sections are mechanically joined together.

8. A combustor liner comprising a first liner section and a second liner section joined together along a common join line, and a heat shield that together with the first and second liner sections forms a substantially continuous surface of the combustor, the heat shield extending along the join line but spaced apart therefrom to define a passage between the heat shield and the first and second liner sections for the introduction of a cooling fluid, the heat shield being separately formed and joined to at least one of the first and second liner sections.

9. A combustor liner comprising a first liner section and a second liner section joined together along a common join line, and a heat shield that together with the first and second liner sections forms a substantially continuous surface of the combustor, the heat shield extending along the join line but spaced apart therefrom to define a passage between the heat shield and the first and second liner sections for the introduction of a cooling fluid, wherein adjacent edges of the first and second liner sections include a first part and a second part defining a u-shaped channel, wherein the first parts of the first and second liner sections are joined together along the common join line, and wherein the second parts of the first and second liner sections extend along the join line to form the heat shield.

10. A combustor liner comprising a first liner section and a second liner section joined together along a common join line, and a heat shield that together with the first and second liner sections forms a substantially continuous surface of the combustor, the heat shield extending along the join line but spaced apart therefrom to define a passage between the heat shield and the first and second liner sections for the introduction of a cooling fluid, wherein the heat shield is separately formed and joined to at least one of the first and second liner sections, wherein adjacent edges of the first and second liner sections include a first part and a second part defining a u-shaped channel.

11. The combustor liner according to claim 10, wherein the first parts of the first and second liner sections are joined together along the common join line and the heat shield extends from the second part of the first liner section to the second part of the second liner section across the join line.

12. The combustor liner according to claim 11, wherein the edges of the heat shield include a u-shaped channel for receiving the second parts of the first and second liner sections.

13. The combustor liner according to claim 11, further including a sealing means to provide a seal between the heat shield and the second parts of the first and second liner sections.

14. The combustor liner according to claim 11, wherein at least one of the edges of the heat shield includes a castellated flange and the second part of at least one of the first and second liner sections is castellated.

15. The combustor liner according to claim 11, wherein the heat shield is joined to the first parts of the first and second liner sections by plunger springs.

\* \* \* \* \*